C. O. PALMER.
PNEUMATIC TOOL.
APPLICATION FILED NOV. 6, 1911.
1,154,797.
Patented Sept. 28, 1915.
2 SHEETS—SHEET 1.
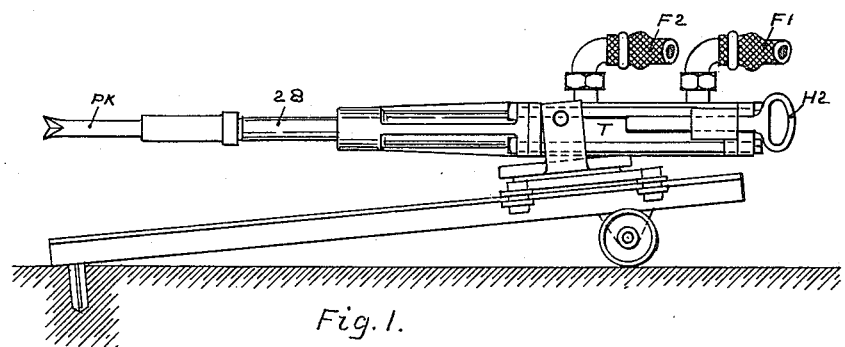
Fig. 1.
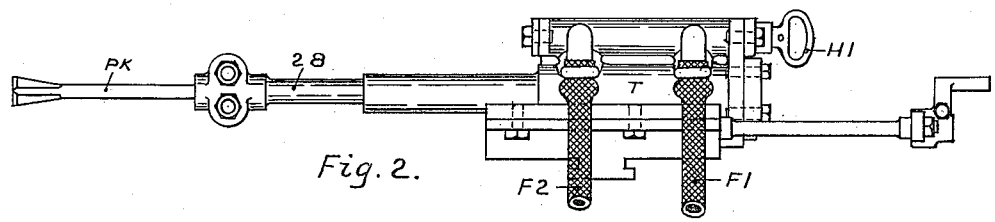
Fig. 2.
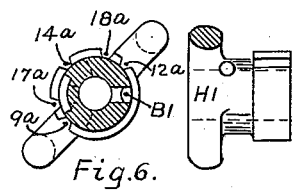
Fig. 6.
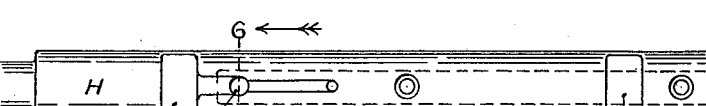
Fig. 3.
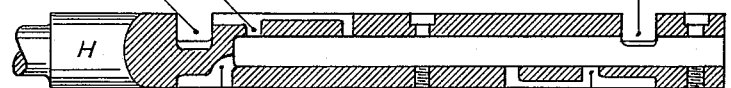
Fig. 4.
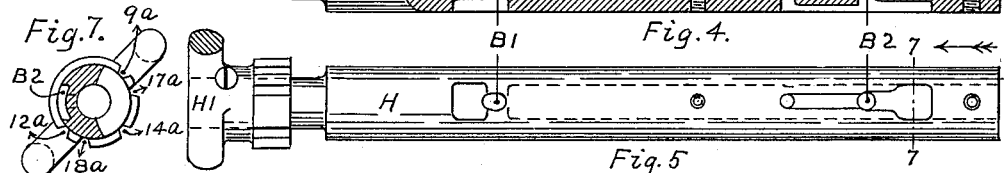
Fig. 7.  Fig. 5.
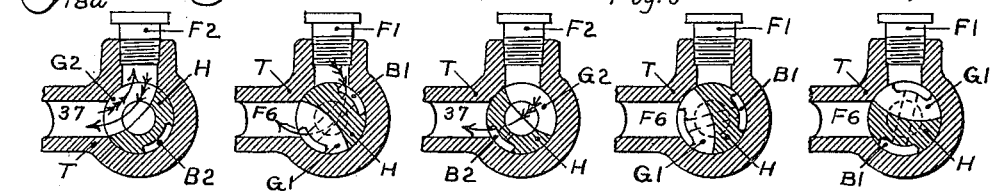
Fig. 14.   Fig. 15.   Fig. 16.   Fig. 17.   Fig. 18.
Witnesses:
Edward W Palmer
J. K. Palmer
Fig. 8.
Inventor:
C. O. Palmer.
COLUMBIA PLANOGRAPH CO., WASHINGTON, D. C.

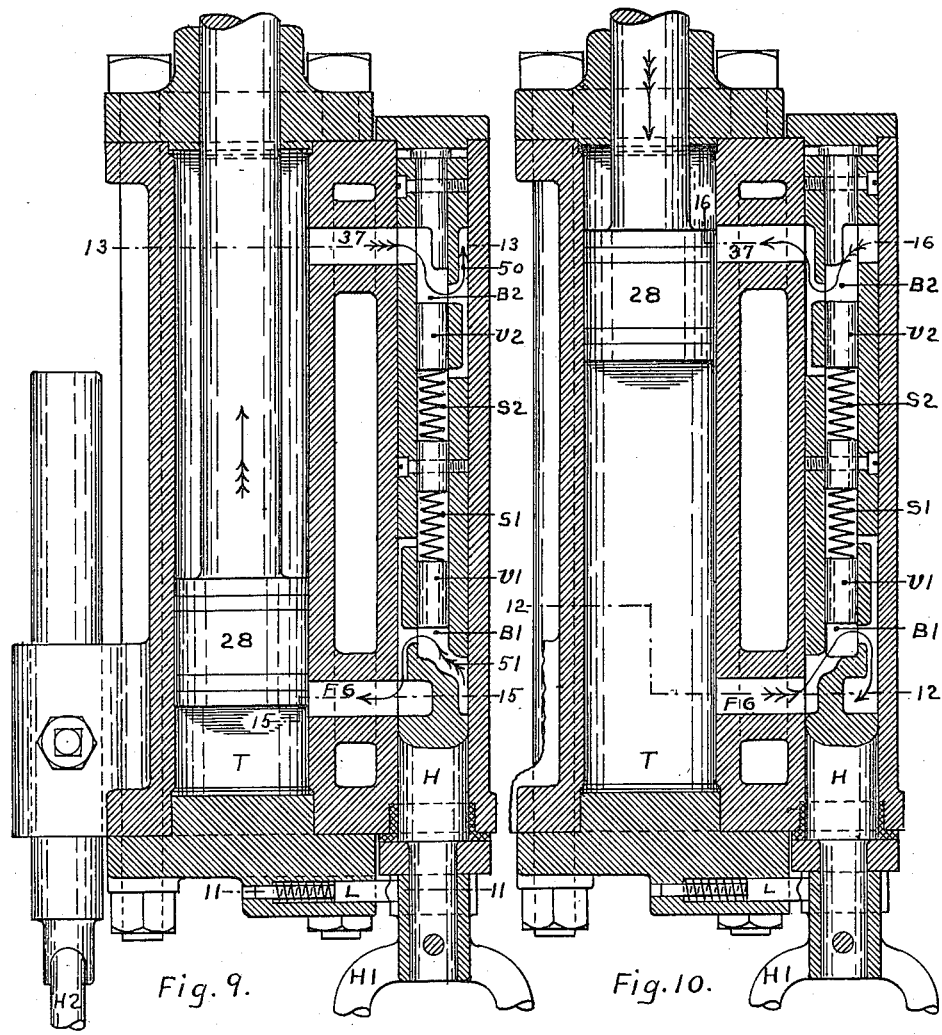
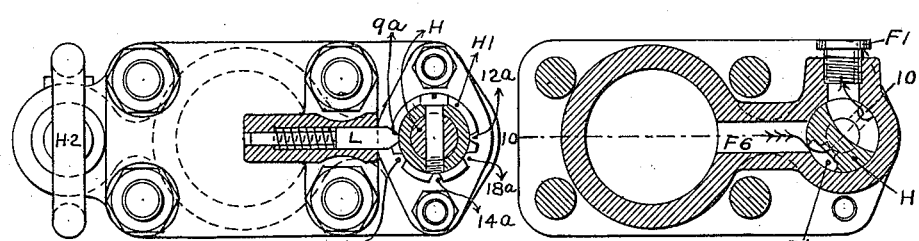
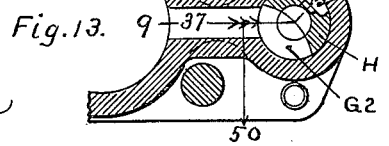

UNITED STATES PATENT OFFICE.

CHARLES OTIS PALMER, OF CLEVELAND, OHIO.

PNEUMATIC TOOL.

1,154,797.  Specification of Letters Patent.  Patented Sept. 28, 1915.

Application filed November 6, 1911. Serial No. 658,659.

*To all whom it may concern:*

Be it known that I, CHARLES OTIS PALMER, a citizen of the United States of America, residing at Cleveland, in the county of Cuyahoga and State of Ohio, have invented certain new and useful Improvements in Pneumatic Tools, and I hereby declare the following to be a full, clear, and exact description of the invention, such as will enable others skilled in the art to which it pertains to make and use the same.

My invention relate to improvements in Pneumatic Tools and are intended for use in connection with pneumatic picks, rock drills, channeling machines, etc., that have a reciprocating piston in a tool cylinder for operating on the material. It is intended especially for use in connection with that class of pneumatic apparatus in which the tool piston is reciprocated by oscillating currents of air as will be noted hereafter.

I will now briefly refer to my inventions as applied to a pneumatic coal pick and from which the application of the same to rock drills and other pneumatic tools will be readily understood.

In the accompanying drawings Figure 1 is a side view on a small scale of a pneumatic pick provided with my inventions and mounted on trunnions and supported on a portable track as shown in my Patent No. 800,479 for a mining machine dated Sept. 26, 1905; Fig. 2 is a side view of a rock drill provided with my inventions and mounted on a guide shell in a well known manner; Fig. 3 is a view of my hand valve H in detail showing the side toward the air gates G1 and G2; Fig. 4 is a longitudinal section in detail of my hand valve H viewed at right angles to Fig. 3; Fig. 5 is a view of my hand valve showing the side opposite the gates G1 and G2; Fig. 6 is a section on line 6—6 of Fig. 3; Fig. 7 is a section on line 7—7 of Fig. 5; Fig. 8 is a detail side view of the bypass valves *v*1 and *v*2; Fig. 9 is a horizontal section of the power pick on line 9—9 of Fig. 13, showing the handle H in position to start the piston forward or to hold it in the front end of the cylinder as shown in Figs. 11 and 13; Fig. 10 is a horizontal section on line 10—10 of Fig. 12 and shows the hand valve H in position to start the piston backward or to hold it in the back end of the cylinder; Fig. 11 is a section on line 11—11 of Fig. 9 showing valve H in the position shown in Figs. 9 and 13; Fig. 12 is a section on line 12—12 of Fig. 10 showing valve H as in that figure; Fig. 13 is a section on line 13—13 of Fig. 9 showing the hand valve H in same position as in that figure; Fig. 14 is a section on line 13—13 of Fig. 9 but with hand valve H in the middle position for ordinary work which allows the air free passage in both directions; Fig. 15 is a section on line 15—15 of Fig. 9 with the valve in same position as in Figs. 9 and 11; Fig. 16 is a section on line 16—16 of Fig. 10 with the hand valve in position for air to enter cylinder as in said figure; Fig. 17 is a section on line 15—15 of Fig. 9, but with valve H set in notch 17*a* of Fig. 11 where all air is shut off; Fig. 18 is a section on line 15—15 of the main back port with valve H set at notch 18*a* of Fig. 11.

The same characters designate the same parts throughout the several views.

The arrows on the piston indicate the direction it is moving and in the air passages the direction the air is moving as stated in the description.

The pneumatic coal pick has a cylinder T which when in use is situated within striking distance of the working face of the coal.

The air pressor or oscillator not shown is of the reciprocating type, and is located near the tool to which it is connected by two tubular connections F1 and F2 which join the ends of the tool cylinder with the oscillator forming a closed air system. The air in the tubular connections F1 and F2 oscillates back and forth toward and from the tool. The direction of flow in one tube generally being simultaneously the reverse of the other. The oscillator or air pressor which is preferably of the type shown in either my application for compressed air apparatus, Ser. No. 369,258 filed April 20, 1907, or Ser. No. 393,386 filed Sept. 17, 1907, or Ser. No. 514,029 filed Aug. 21, 1909, may be driven by an electric motor or any other well known means.

The principal objects of my inventions are: to provide a simple and convenient means of throttling the air by hand, to regulate the blow to suit the working conditions which usually require a light blow for starting and a hard blow for regular work, also to move and hold the tool piston at one or the other end of the cylinder as the case may require, also to simplify and cheapen the construction as will hereafter be set forth.

To this end, my inventions consists of the following combination and arrangement of parts: A combination hand valve and directing handle by means of which the operator is able to throttle the air supplied to one or both of the main cylinder ports without removing his hand from the directing handle: by combining with the hand valve a bypass passing through the throttle and placing in the bypass a check valve in such a manner as to allow air to move in only one direction in said bypass: by so placing the hand valve as to allow the air to move in the desired direction through the main port: by so throttling the air as to force the piston to make a light or a hard stroke or to force the piston to one or the other end of the cylinder as different circumstances may require. Also in certain details hereafter described and pointed out in the claims by which the construction is simplified that the expense of manufacture and maintenance is reduced.

In starting the tool and in various other conditions of operations in handling it, a change in the force of the blow is often required to operate the machine to the best advantage. It is occasionally desired to push the tool piston to the forward end of the cylinder, as when placing the machine in the desired position for working. Also it may be necessary to pull the piston to the rear end of the cylinder as when preparing to strike the first blow or when the pick or drill becomes stuck in the coal or rock. To meet these conditions I employ a rotary hand-valve (hand operated valve) which, operating in connection with the bypass and check valve, will: 1. Control the amount of air passing into and out from the cylinder through the main port. 2. Prolong the life of the check valve by saving it from continual wear during the ordinary operation of the tool. 3. Allow the passage of air through the bypass out of the cylinder only. 4. Allow the passage of air through the bypass into the cylinder only. 5. Simplify the construction and cheapen the cost of manufacture by forming the bypass valve to slide lengthwise inside the hand valve.

The coal pick has a cylinder T which is mounted on a carriage that runs on a track within striking distance of the working face of the coal as shown in Fig. 1 and is connected with the oscillator by rather short tubular connections F1 and F2. (See Fig. 1.) Pneumatic coal picks must be very strong or they would be bent or broken by the rough usage incidental to their use. Six hundred pounds is a common weight, and it makes about 3 strokes or more per second. The machine runner selects a point on the coal where his pick will do the greatest execution. The surface is usually uneven and (especially if the aim is not true) the pick will glance or jump when it strikes the coal. This throws the pick off to one side and makes it difficult to aim the pick to strike the succeeding blows in the desired spot. The operator can aim the blows more accurately if he uses both hands to direct the pick than if he uses only one. And when both hands are on the directing handles H1 and H2 it is a rotary movement of the handle that is easiest for him to make. This glancing or jumping of the pick which is so difficult to control is more difficult with hard than with light blows, because the pick glances farther if the pick strikes the coal harder. I have, therefore, constructed a rotary or swivel directing hand valve H, the turning of which throttles the air supplied to the pick and thereby makes a lighter blow, which, in turn, is easier to direct.

In Figs. 3 to 7 are shown in detail the hand valve H with the handle H1. In a general way it consists of a hollow cylindrical stem that fits closely but loosely in a hole formed lengthwise in the cylinder casting T. As the mechanisms serving the two main ports 37 and F6 are essentially alike, I will now describe that which serves the front end port 37 and from which with the aid of the drawing and description the other mechanism will be readily understood. Formed in the hand valve H and registering with the port 37 is the gate G2 that allows a free passage of air from the main port 37 to the tubular connection F2 that serves the forward end of the cylinder when the valve H is in the ordinary working position, called the middle position and shown in Fig. 14. The rotation of the valve H closes the air passage leading to the port 37 as will be hereafter described. A bypass B2 is formed (preferably passing through the stem) and connects the main port 37 with the air tube F2 when the hand valve H is closed as shown in Fig. 13. Inside the hand valve H and closing the bypass B2 is the check valve v2 that opens by pressure on the end from one direction in the bypass and is not opened by pressure from the opposite direction in the bypass. The check valve v2 is closed by the spring s2. The piston head itself when moving toward the end of the cylinder closes the main port and thereby forms a pocket of air on which to cushion the piston to prevent it striking the cylinder head and wrecking the tool. The natural rebound of the piston so cushioned usually carries it far enough from the end to again uncover the main port and allow the air to get between the piston and cylinder heads to act on the piston in the ordinary manner. But if the piston gets stopped at the back end of the stroke so there is not sufficient rebound to more than partially open the main port, the hand valve is turned to the position shown in Figs. 9 and 13. In this position the air leaves the front end of the cylinder through the bypass B2 and check valve $v2$ which it forces open against the pressure of the spring $s2$. The succeeding reverse impulse of air however in the front end of the cylinder, does not press against the end of the check valve, so cannot open it.

Simultaneously with the action in the front end of the cylinder above described the action at the back end of the cylinder is as follows: The incoming air from the pressor or oscillator presses on the end of the check valve $v1$ which it opens (against the spring $s1$) and enters the rear end of the cylinder through bypass B1 (as shown by the arrow 51) in Fig. 9. The valve then closes and the inclosed air has no effect in opening the check valve $v1$, so it does not allow the confined air in the cylinder to escape. The full effective air pressure on the piston is thus used to force the piston forward and none of the effective air pressure to drive it backward. If the tool should get stuck when in the outward position shown in Fig. 10, the hand valve H would be given a turn to the position shown in Figs. 10 and 12. When in this position the air can enter the forward end of the cylinder through the check valve $v2$, (see Figs 10 and 16) but cannot leave it through the same valve. Also the air can leave the rear end through bypass B1 and check valve $v1$, but cannot enter through this check valve. The full effective pressure on the piston is thus used to force the piston backward but none of the effective pressure to drive it forward. It will thus be observed that the two check valves $v2$ and $v1$ coöperate to produce a movement of the piston in the same direction. The end of the cylinder to which the piston is driven depends on the position in which the hand valve H is placed. This valve mechanism at each end of the cylinder just described is independent of the mechanism at the other end. In other words the valve mechanism as shown at either the forward or rear main port could be omitted and the connecting tube F1 or F2 led direct into the end of the cylinder in the ordinary way without affecting the action of the valve mechanism just described, at the other port of the cylinder. In other words suppose the pressure in each end of the tool cylinder alternates between three and five atmospheres. That is the effective pressure of two atmospheres acts alternately in each end of the cylinder. If now we allow entrance only of air in the front end of the tool cylinder shown in Fig. 10 we raise the pressure in the front end to five atmospheres. And as a result the high pressure in the rear end of the tool cylinder is balanced, and there is produced only pulsations of effective pressure in the front end of the tool cylinder. One to every other stroke of the compressor. But if there is also a coöperating valve $v1$ in the rear end of the cylinder as shown in Fig. 10 it would at the same time allow only escape of air from the rear end of the cylinder and there would be produced only low pressure in the rear end of the tool cylinder. This would result in a continuous pressure (as distinct from the pulsating pressure above noted) being exerted from the forward end of the tool cylinder. If in Fig. 10 the hand valve is turned so that the front end valve allows only the escape of air from the tool cylinder, then low pressure only would be produced in the forward end of the cylinder. This would result in pulsations of effective pressure in the rear end of the tool cylinder. If there was a coöperating valve in the rear end as in Fig. 9 we would have a continuous effective pressure in the rear end of the cylinder and no effective pressure in the forward end of the cylinder. The hand valve H may also be used to throttle or partly throttle the oscillating currents of air passing the main ports 37 and F6. In Fig. 17 the hand valve is shown in its left closed position, and in Fig. 18 the hand valve is in the right closed position.

In Fig. 14 the hand valve is in middle position and the main ports 37 and F6 are both open. By my invention, the bypasses B1 and B2 are closed during the ordinary working of the tool and the check valves $v1$ and $v2$ are thus saved much useless wear. The hand valve H is kept in the various five positions above mentioned by the latch L that fits into the various notches as shown in Fig. 11; thus notch 14$a$ is the middle position used in ordinary working and is the same as shown in Fig. 14. Notch 17$a$ corresponds to the position shown in Fig. 17 where the air is cut off. The notch occupied by the latch in Fig. 11 corresponds to the position shown in Figs. 9 and 15 where the piston is being forced outward. Notch 18$a$ corresponds to the position shown in Fig. 18 where the air is also cut off. Notch 12$a$ corresponds to the position shown in Figs. 10 and 12 where the piston is being forced backward or inward.

An ordinary manually operated faucet on the top of the pick to regulate the air to the ordinary pick is common, but the operator must use only one hand for directing the pick while he employs the other hand to operate the faucet. With my device he can use the same hand to direct the blows while he regulates the supply of air to produce the force of stroke that is needed.

Having thus described my invention, I claim:

1. In a pneumatic tool of the class described, the combination with a tool cylinder having a piston therein, of front and back ports opening into the tool cylinder on opposite sides of the piston, a rotary plug or hand valve positioned parallel with said cylinder and running through said ports, notches in said plug registering with said ports, a bypass passing through said hand valve at each of said ports and reversely acting check valves in said bypasses, substantially as described.

2. In a pneumatic tool of the class described the combination with a tool cylinder having a piston therein, of front and back ports opening into the tool cylinder on opposite sides of the piston, port valves in both of the ports, a bypass through each port valve, a check valve in each bypass formed to slide lengthwise in said port valve and adapted when in one closed position of the port valve to be opened by pressure from within the cylinder only, and when in the opposite closed position of the port valve to be opened by pressure from without the cylinder only, the said port valves being reciprocal in their action, substantially as described.

In testimony whereof, I sign the foregoing specification, in the presence of two witnesses.

CHARLES OTIS PALMER.

Witnesses:
HARRY T. GETTINS,
VICTOR C. LYNCH.

Copies of this patent may be obtained for five cents each, by addressing the "Commissioner of Patents, Washington, D. C."